April 15, 1924.
F. O'NEILL
MOLTEN GLASS CHARGE SUPPLY
Filed April 28, 1920  3 Sheets-Sheet 3
1,490,182
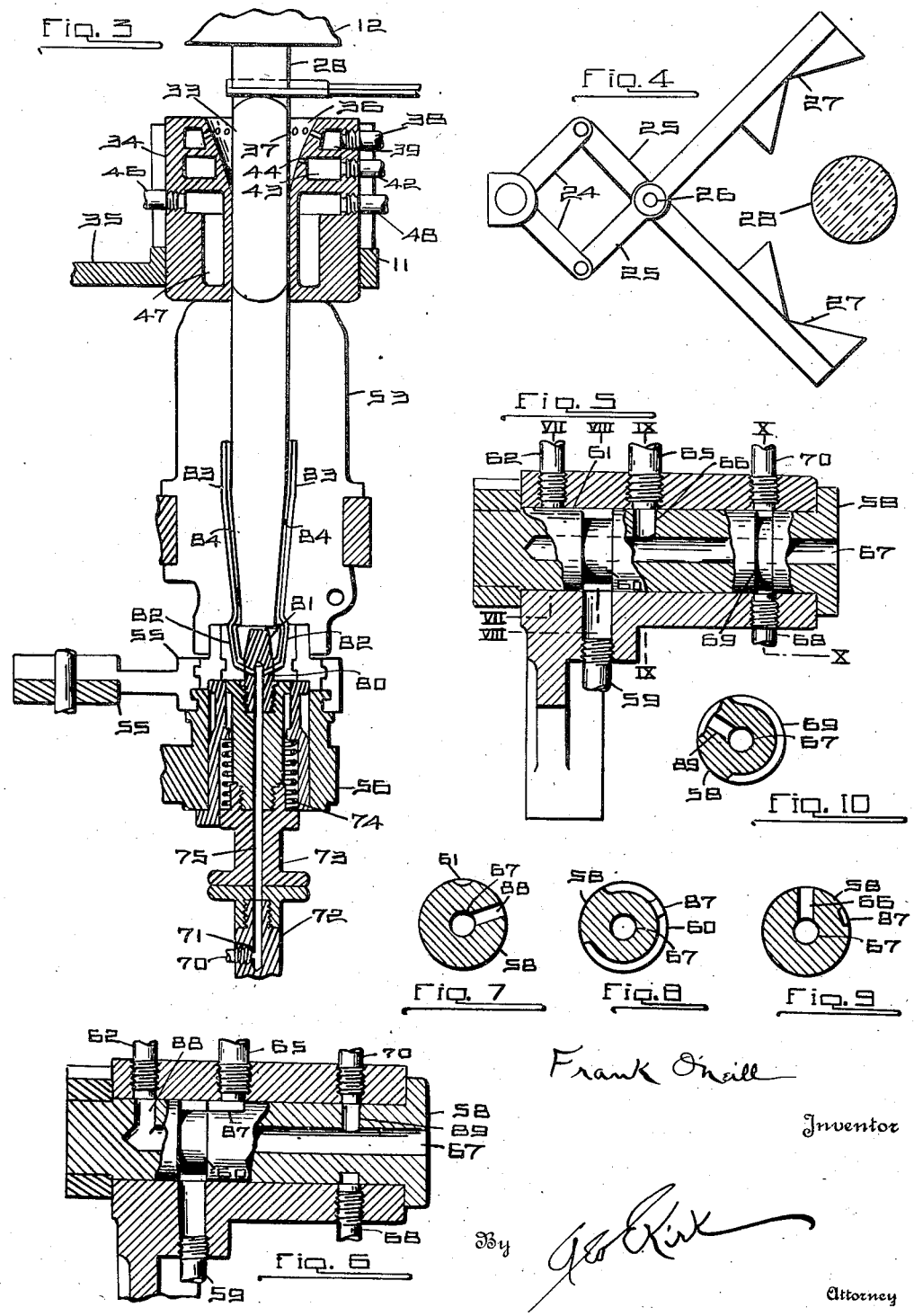

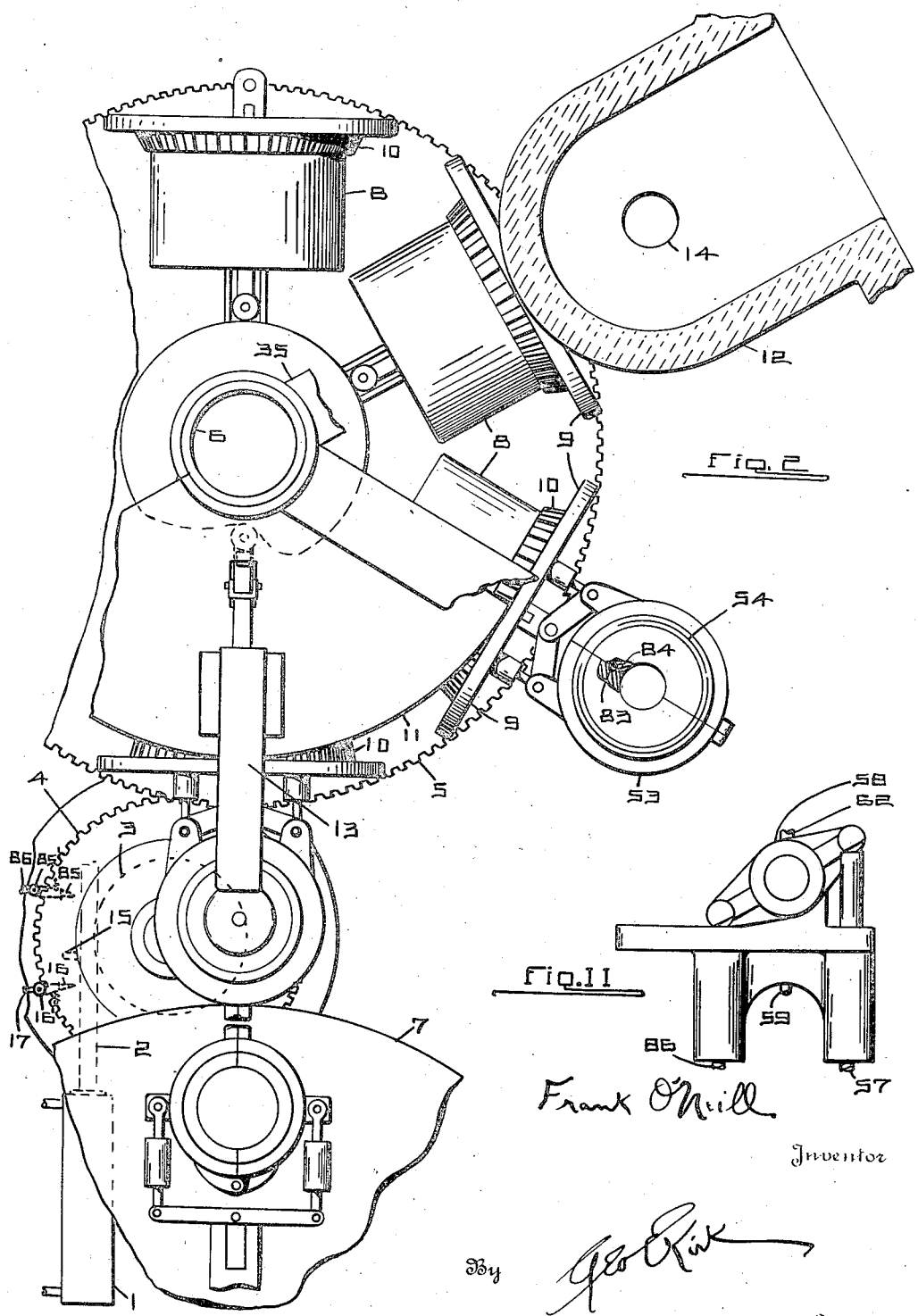

Patented Apr. 15, 1924.

1,490,182

UNITED STATES PATENT OFFICE.

FRANK O'NEILL, OF TOLEDO, OHIO.

MOLTEN-GLASS CHARGE SUPPLY.

Application filed April 28, 1920. Serial No. 377,344.

*To all whom it may concern:*

Be it known that I, FRANK O'NEILL, a citizen of the United States of America, residing at Toledo, Lucas County, Ohio, have invented new and useful Molten-Glass Charge Supplies, of which the following is a specification.

This invention relates to gathering or charge supplying, especially of molten glass to glassware forming apparatus.

This invention has utility when incorporated as a cut-off charge supply for rotary table apparatus, as in bottle blowing machines.

Referring to the drawings:

Fig. 1 is a fragmentary side elevation of an embodiment of the invention in connection with a glass bottle blowing machine, say such as shown in applicant's application for U. S. Letters Patent Ser. No. 250,488, filed Aug. 19, 1918;

Fig. 2 is a plan view, with parts broken away, of the machine of Fig. 1;

Fig. 3 is a vertical section through the charge supply guide, showing the blank mold associated therewith;

Fig. 4 is a plan view of the shear or cut off mechanism;

Fig. 5 is a section showing the pneumatic control ducts as connected for drawing the charge into the blank mold;

Fig. 6 shows the ducts of the control in the cut-off position, or the reverse of the showing of Fig. 5;

Fig. 7 is a section on the line VII—VII, Fig. 5;

Fig. 8 is a section on the line VIII—VIII, Fig. 5;

Fig. 9 is a section on the line IX—IX, Fig. 5;

Fig. 10 is a section on the line X—X, Fig. 5; and

Fig. 11 is an end elevation of the valve of Fig. 5,

Figure 1:
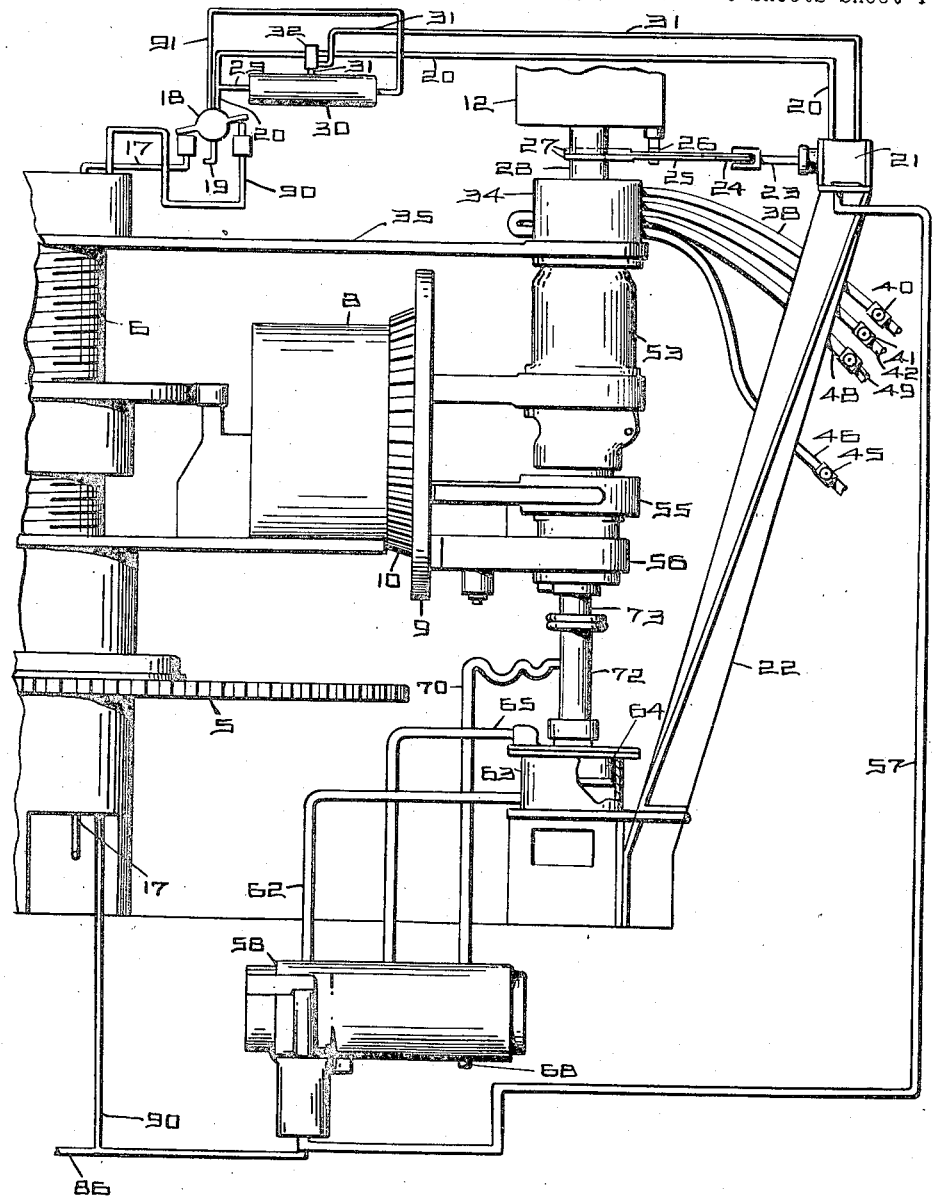

A main power drive cylinder 1 has piston rod 2 reciprocable for oscillating member 3 in effecting intermittent or step by step driving of toothed member 4. This member 4 is in mesh with gear 5 rotatable on column 6 in synchronism with finish or blow mold table or carrier 7. The blank mold carrier table or gear 5 has bearings 8 60° apart which mount blank mold sustaining disks 9 having bevel gear portions 10 which may engage with fixed segment 11 during such part of the travel of the table or gear 5 that from inverted position at charge supplying station or region of glass tank overhang 12 the blank mold may be righted at transfer station 13, and again be inverted before again reaching the station for charging.

In the bottom of the overhang 12 from the supply tank for the pool of molten glass there is an opening 14, from which as a throat there may, in the embodiment of the invention herein, be a continuous flow of molten glass. The fluidity of the molten glass, together with the frequency of the steps of the intermittent travel of the table or carrier gear 5 may determine the quantity or volume of molten glass in each charge or cut off portion. Further volume control is obtained in determining the cross-sectional area of the throat 14.

The gather or molten glass supply as a continuous flow cut-off apparatus, is herein disclosed as incorporated as a power actuated or automatic feature of a ware forming machine. The power actuation and control is disclosed as pneumatic, and in connection with an air operated machine.

Near the end of the power or driving stroke of the piston rod 2 in the cylinder 1, finger 15 on the piston rod 2 strikes arm 16 to allow a puff of air to pass valve 16' by way of line 17 to rocker valve 18. Power air by line 19 to valve 18 is thus allowed to pass to line 20 to cylinder 21 on bracket 22.

This power air thus draws piston rod 23 (Figs. 1, 4) into the cylinder 21. Connected to the rod 23 is a pair of links 24 pivoted to levers 25 of a shears which has a fulcrum pin 26 fast with the tank 12. The outer or free ends of the levers 25 are provided with V-jaws slidable past or over each other into fully closed position in cutting stream 28 of glass from the throat 14.

Air line 29 as a branch of the line 20, extends to timing or retarding cylinder 30, which will permit slightly delayed air flow therefrom by way of air line 31 to act upon check valve 32 in cutting off air flow by the line 20 to the piston rod end of the cylinder 21, while the line 31, extends by the way of this valve 32 to the remote end of the cylinder 21 to thrust the piston rod 23 outward from the cylinder 21 in at once opening the shear 25, to minimize the exposure to heat of the jaws 27, at once the cutting operation is completed.

The sheared off portion of molten glass 33 settles down into a guide 34 carried by fixed arm 35 from the column 6. This guide 34 has upper funnel shaped portion 36 having therethrough an annular series of holes 37 as a gas burner, fuel for which is supplied by line 38 to annular chamber 39 (Figs. 1, 3). By controlling valve 40, the burner may be adjusted to increase the fluidity of the throat discharged molten glass, and thereby vary the volume or discharge rate in a convenient and accurate manner, as well as provide means for controlling the desired fluidity of the molten charge in its travel through the guide 34.

Valve 41 in line 42 may control the supply of oil as a lubricant to annular chamber 43 from which an annular series of openings 44 may permit discharge about the inner wall of the guide 34. There is thus provided controllable lubrication of the guide 34.

In order that the temperature of the guide 34 may not become too high, valve 45 in water or steam supply line 46 may control flow to annular chamber 47, from which the discharge by line 48 may be adjusted by valve 49.

This guide 34 has the lines thereto slightly flexible and to this end such may be hose. The arm 35 has an annular shoulder normally substaining a collar carrying the guide 34. Gravity holds this collar against the shoulder so that a pair of blank mold sections 53, 54, may ride up thereunder and slightly lift the guide 34, as the blank mold comes to registering position as to the guide 34. This lift of the guide 34 in practice may be as slight as $\frac{1}{64}''$. The sectional blank mold 53, 54, is mounted on the disk 9. Accordingly at the charge supply station, sectional blank mold 53, 54, in registry with the guide 34, sufficiently lifts such guide 34 to insure accurate sealing therewith.

The blank mold, besides the hinged mounted blank mold main sections 53, 54, has a pair of neck finish mold sections 55 hinged for independent movement as to the disk 9, and a head 56 fixed with the disk 9.

The air to the cylinder 21, which is fixed at the charge station on the bracket 22, from line 20 passes by line 57 to operate rocker valve 58. Power air from line 59 by ways 60, 61, in the valve 58 then allows flow by way of air line 62 to the lower part of cylinder 63 to lift piston 64. The exhaust from the upper side of the piston 64 may flow by line 65 to radial way 66 in the valve 58 in communication with axial exhaust duct 67. The valve 58 in this position also permits suction line 68 through way 69 in the valve 58 to communicate with air line 70. This flexible line 70 is in communication with duct 71 in piston rod 72 lifted by the piston 64 into registry with plunger 73, yieldably urged downward by helical spring 74 in the head 56.

The lifting of the piston rod 72 and the suction on the duct 71 are effective not only to seal the joint between the piston rod 72 and the plunger 73, but to bring about a drawing of air from the closed blank mold. The plunger 73 has therein a duct 75 extending upward to branches 80, in neck center 81 thrown upward by the piston rod 72. As the center 81 reaches its upward position, the branches 80 are brought into communication with ducts 82, of the neck finish which latter register with ducts 83 in the joint formed by the closing of the blank mold sections 53, 54. From the ducts 83, there is slight clearance by vents 84 to the interior of the closed blank mold permitting the suction from the line 70 to assist in drawing the slug of molten cut-off glass quickly from the guide 34 downward into the blank mold.

As the piston rod 2 approaches the end of its outward or idle stroke, the pin or finger 15 thereon strikes one way thrown arm 85 to allow a puff of air to pass valve 85' and flow by line 86 to reset the valve 58 by reversing the rock thereof, thereby connecting the power air line by the way 60, and way 87 to the line 65, to depress the piston 64 in the cylinder 63, thus allowing the spring 74 to thrust the plunger 73 downward. The piston 64 in settling has exhaust flow by way of the line 62, radial way 88, to the axial way 67. The exhaust or rather suction line 68 is cut-off and the line 70 by radial way 89 is in communication with exhaust way 67.

A branch duct 90 from the duct 86 extends to reset rocker valve 18 so that power air from the duct 19 passes by way of line 91 to reset timing cylinder 30. The mechanism is now all in readiness for a repetition of the cycle of operations, after table shifting brings the next blank mold to the charging station.

What is claimed and it is desired to secure by Letters Patent is:

1. Means providing a stream glass supply, a mold movable into alignment with said supply, and a flare throat guide for directing stream flow to the mold, said guide comprising a burner to soften the entering stream of glass, a lubricant supply for the glass as to the guide, and temperature control means for the guide.

2. Means providing a molten stream of glass supply, a shear for dividing the stream into sections, a guide into which the stream sections are dropped from the shear, a glass blank receiving mold movable into registering position as to the guide, and suction means effective through the mold for acting upon a stream section in its travel into the mold from the guide.

3. Means providing a molten stream of glass supply, a shear for severing the stream into sections, a guide for receiving the sections in approximately closing the cross-section of the guide, a series of blank receiving molds successively movable into registering position with the guide, and suction means coacting with a guide registering mold for accelerating section travel from the guide to the mold.

4. Means providing a continuously flowing stream of glass supply, a normally open shear, means for operating the shear for severing the stream into slugs, a guide for receiving the slugs as severed from the stream by the shear, a plurality of molds successively movable into registering position with the guide, and suction means coacting through a guide registering mold for accelerating the travel of a slug through the guide as such slug is severed from the stream of glass.

5. Means providing a downwardly continuously flowing laterally peripherally exposed stream of molten glass, a normally open shear, means for operating the shear for severing the stream of glass into slugs, a guide in the line of the stream, therebelow and approximating in cross-sectional area the cross-sectional area of the stream, for receiving the slugs, an annular series of molds successively movable into registering position with the guide, suction means coacting through a guide registering mold, and control means for the shear and suction means for at once accelerating the slug as it is severed for travel through the guide into the mold therebelow.

FRANK O'NEILL.